US006632375B2

(12) United States Patent
Rabarot et al.

(10) Patent No.: US 6,632,375 B2
(45) Date of Patent: Oct. 14, 2003

(54) METHOD FOR FORMING A CONCAVE MICRO-RELIEF IN A SUBSTRATE AND USE OF SAID METHOD FOR PRODUCING OPTICAL COMPONENTS

(75) Inventors: Marc Rabarot, St Egreve (FR); Jean Marty, Seyssins (FR)

(73) Assignee: Commissariat a l'Energie Atomique, Paris (FR)

( * ) Notice: Subject to any disclaimer, the term of this patent is extended or adjusted under 35 U.S.C. 154(b) by 81 days.

(21) Appl. No.: 09/913,879

(22) PCT Filed: Dec. 29, 2000

(86) PCT No.: PCT/FR00/03743

§ 371 (c)(1),
(2), (4) Date: Aug. 21, 2001

(87) PCT Pub. No.: WO01/50159

PCT Pub. Date: Jul. 12, 2001

(65) Prior Publication Data

US 2002/0125210 A1 Sep. 12, 2002

(30) Foreign Application Priority Data

Dec. 30, 1999 (FR) .............................................. 99 16761

(51) Int. Cl.[7] .............................................. B44C 1/22
(52) U.S. Cl. .............................. 216/26; 216/55; 216/38; 216/88
(58) Field of Search ............................. 216/24, 26, 55, 216/38, 88

(56) References Cited

U.S. PATENT DOCUMENTS

| 4,776,868 | A | 10/1988 | Trotter, Jr. et al. |
| 5,504,302 | A | 4/1996 | Hentze et al. |
| 5,871,653 | A | 2/1999 | Ling |

FOREIGN PATENT DOCUMENTS

| EP | 0523861 | 1/1993 |
| WO | WO 91/11320 | 8/1991 |

OTHER PUBLICATIONS

Maciossek A, et al. "Galvanoplating and Sacrificial Layers for Surface Micromachining" *Microelectronic Engineering, NL, Elsevier vol. 27, No. 1, Feb. 1995*, pp. 503–508, XP–004025130.
Wengelink J., et al. "Semitransparent Mask Technique for Relief Type Surface Topographies" *Microelectronic Engineering, NL, Elsevier Publishers BV., Amsterdam, vol. 27, No.. 1, Feb. 1995*, pp. 247–250, XP–004025075.
Han W. Saft, Replicated Optics Cover the Spectrum, Photonics in Communication, Feb. 1994, 3 pages.
Dr. M. Popall, et al., ORMOCERs, inorganic–organic polymer materials for applications in micro systems technology, 11 pages.
H.J. Quenzer, et al., Fabrication of Relief—Topographic Surfaces with a One–Step UV–Lithographic Process, 10 pages.
Georges Przyrembel, Continous–relief microoptical elements fabricated by laser beam writing, 10 pages.
Jorg Wengelink; Generation of Relief–type Surface Topographics for Integrated Microoptical Elements, 9 pages.
F. Gex, et al., Programmable Manufacturing Technique of Long–Focal–Length Microlens Arrays, No. 94007, 5 pages.
Margaret B. Stern, et al., Dry etching—Path to coherent refractive microlens arrays, SPIE vol. 1992, 10 pages.

*Primary Examiner*—William A. Powell
(74) *Attorney, Agent, or Firm*—Thelen Reid & Priest LLP; Robert E. Krebs (57) ABSTRACT

Process for the formation of at least one concave relief (124, 145) in a substrate comprising forming at least one embossment of material subject to creep (100) on the substrate (120), —heating of the material subject to creep to a temperature sufficiently high to cause creep of the said material, and—etching of the substrate and the crept material to form relief in the substrate. According to the invention, the crept material is solidified in a state in which it has a concave relief.

20 Claims, 10 Drawing Sheets

METHOD FOR FORMING A CONCAVE MICRO-RELIEF IN A SUBSTRATE AND USE OF SAID METHOD FOR PRODUCING OPTICAL COMPONENTS

This application is a national phase of PCT/FR00/03743, and International Application No. 99/16761, which was filed on Dec. 30, 1999, and was not published in English.

TECHNICAL FIELD

This invention relates to a process for the formation of a concave micro-relief in a substrate and use of this process for making different types of components or optical systems.

The invention is used for applications in micro-optics and particularly for the manufacture of concave mirrors, and also plane-concave, convex-convex or concave-concave type lenses. These components may be in individual form or may be integrated in optical systems. Micro-relief is also useful in the biotechnology field.

Note that the process according to the invention may also be used to make classical, cylindrical or spherical components with a given constant radius of curvature, or non-spherical components with a variable radius of curvature.

One particular application of the invention is the manufacture of a cavity and/or a mirror with a concave cavity for a microlaser with an unstable cavity, or for the production of a microdish that can be used in biotechnology equipment.

STATE OF PRIOR ART

For the purposes of this invention, the terms convex and concave are used to qualify the type of curved surface of an optical component, a layer of material or a substrate. These terms are applicable to the curved surface as seen from the outside of the said component, layer or substrate.

At the present time, there are several known techniques for manufacturing curved surfaces. Most of these techniques have been developed for the fabrication of spherical or cylindrical lenses.

Figure 1:
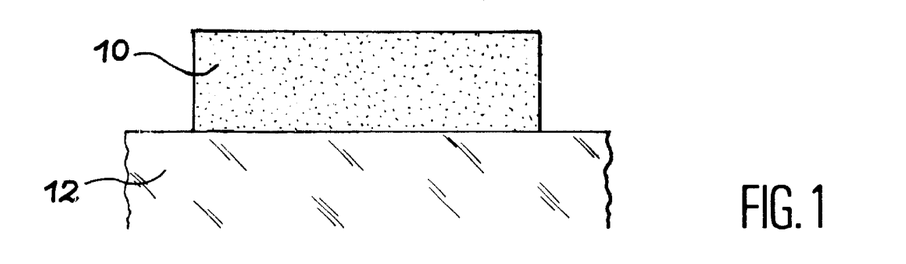
FIGS. 1 to 3 are diagrammatic sections through a substrate illustrating the successive steps of a known process for formation of convex relief in a substrate.
Figure 2:
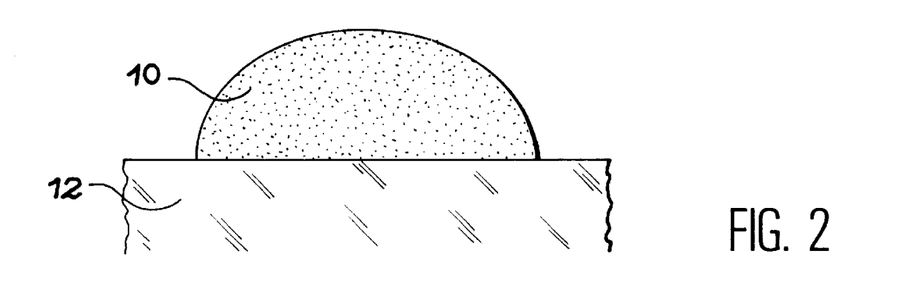
Figure 3:
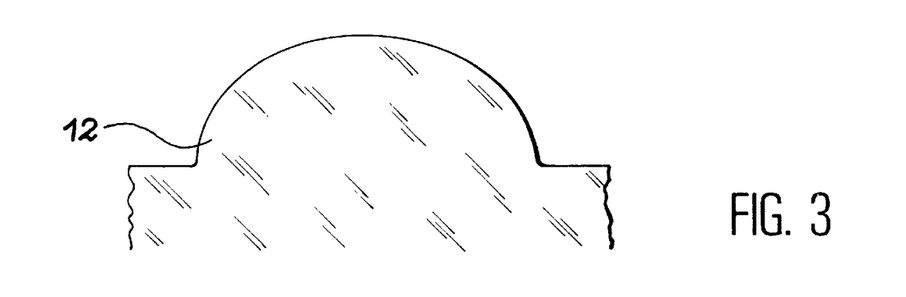

FIGS. 1 to 3 in the appendix diagrammatically show the main steps of a process designed to apply a convex relief to the surface of a substrate.

A first step illustrated in FIG. 1 comprises the definition of a resin embossment 10 on a substrate 12. In this case the embossment is a disk. For example, the embossment 10 may be formed by the deposition of a photosensitive resin layer and by a photolithography treatment to eliminate the layer away from the embossment. The embossment 10 is centered on the part of the substrate on which the surface is to be curved.

A second step illustrated in FIG. 2 consists of heating the resin embossment to make it melt. During this heat treatment, surface tensions will vary the shape of the resin embossment to change it to the form of a spherical drop (convex).

As the heat treatment is continued, the resin becomes cross-linked and solidifies while keeping its spherical shape.

A third step consists of transferring the shape of the resin drop into the substrate. This transfer takes place by applying a vertical anisotropic etching to the substrate and the resin. This etching eliminates a thickness of the substrate, that is thinner when the resin is thicker, at all points on the surface of the substrate. The resin is also eliminated as the etching progresses.

After the resin has been completely eliminated, the etching is stopped. This gives a substrate 12 conform with FIG. 3 with a convex relief locally corresponding to the shape of the resin drop (that has disappeared).

The production of concave relief is more complex and more expensive. It requires an additional number of steps in the process.

According to a first technique, a substrate according to the substrate 12 in FIG. 3 can be used as a stamping die to make a concave relief with a complementary shape in another substrate.

In particular, the stamping technique may be used to form the complementary concave relief in a layer of photosensitive resin. This resin layer may then be used for transfer by etching of the concave shape in a substrate, in accordance with the third step in the process described above.

Obviously in this case, the melting heat treatment is not performed on the resin, to avoid eliminating the relief formed by stamping.

Examples of this technique are described in documents (1) and (2), for which the references are given at the end of this description.

Other techniques for producing a concave relief have been developed in order to avoid the need to make a stamping die in advance and the corresponding costs.

These techniques also make use of a resin layer, and more particularly a photosensitive resin layer that can be formed according to photolithographic processes. A concave relief is applied to the resin by insolation for which the intensity is controlled locally.

The insolation intensity may be controlled (as shown in document (3)), using a lithography mask. The mask is used to create different "gray shades" and thus modulate the depth of the insolated resin.

This technique is advantageous in that it enables the development and structuring of a resin layer with a given relief in a single insolation cycle. However, lithography machines for embossment are expensive. The development and use of machines for the above process are also long and complex operations.

Insolation may also be controlled by controlling a laser beam or an electron beam used as the insolation source.

According to one possibility, the power of the source may be varied to correspond with the region of the insolated resin layer.

According to another possibility, the power of the source can also be kept constant while scanning the resin layer. In this case, the insolation is controlled by adjusting the speed and the relative displacement directions between the insolation source and the resin layer.

These techniques make use of opto-mechanical treatment benches that are also expensive and complex. They also introduce difficulties related to making joints at the center of patterns with a symmetry of revolution. These difficulties can reduce the quality of the relief obtained and therefore make the technique unsuitable for the manufacture of some optical components.

For example, an illustration of the techniques involving control of the insolation source is given in documents (4) and (5). The references of these documents, and the references of other documents mentioned, are given at the end of the description.

The resin layer may be scanned by an insolation beam combined with the use of a mask, as described in document (6). Therefore the technique described in this document is similar to the techniques described above and has more or less the same disadvantages.

Document (7) describes a method for making concave relief that does not make use of an intermediate layer of photosensitive resin that will define the shape of the relief.

The substrate in which it is required to form the relief is etched directly using a reactive ionic etching process. The etching anisotropy is controlled by adjusting the dimensions of an etching mask and the reactive etching parameters.

This technique is apparently advantageous, and has a scope limited to materials that may be etched using a reactive plasma. Furthermore, it cannot be used to obtain a good optical surface quality with a wide range of radii of curvature, or a good manufacturing efficiency.

A better manufacturing efficiency may be obtained by collective treatment of optical component preforms. According to this method, the preforms are embedded in a coating material and are then abraded and polished with the coating material. The surface of components may be made convex by selecting a coating material with a lower resistance to abrasion than the resistance of the preform materials, or it may be made concave if the abrasion resistance of the coating material is higher.

For example, this abrasion treatment may be applied to the production of plane-convex type microlaser cavities.

These cavities, also called unstable cavities, are used to increase the size of the beam and therefore the output power of the microlasers on which they are used. The concave radius of curvature of the surface of the microcavities is within a range from a few millimeters to a few hundreds of millimeter, for diameters ranging from a few tens of micrometers to a few hundred micrometers.

Documents (8) and (9) provide illustrations of these cavities.

As described above, the technique for the formation of concave (or convex) relief by abrasion is suitable for the collective and economic manufacture of optical components such as microlaser cavities. However, they cannot always give a required value of the radius of curvature or a very good optical quality.

Furthermore, the described process requires many preliminary preparation steps that cannot always be done collectively.

DESCRIPTION OF THE INVENTION

The purpose of the invention is to propose a process that enables the formation of a concave relief in a substrate that can be used for making optical components or optical systems, and that does not have the difficulties or limitations of the techniques mentioned above.

One purpose in particular is to propose such a process that is economic and adapted to processing for the collective production of a large number of components.

Another purpose is to propose such a process that uses a small number of operating steps and that enables precise control of the resulting radii of curvature and relief.

Another purpose is to propose such a process that can be used to make optical layers or components with a surface condition with a good optical quality and that can be used to make spherical or non-spherical relief.

Another purpose of the invention is to propose processes for making plane-concave, concave-concave or convex-convex type lenses, and optical systems comprising one or several of these lenses.

More precisely, the objective of the invention in order to achieve these purposes is a process for making at least a concave relief in a substrate comprising the following steps:

formation of at least one embossment on the substrate, made of a material subject to creep, the embossment of material subject to creep having a shape factor defined by the ratio of the average height h of the embossment to the dimensions of a contact area s between the embossment and the substrate, heating of the material subject to creep to a sufficiently high temperature to cause creep of the said material, and etching of the substrate and the crept material to form a relief on the substrate.

For example, the dimension of the area s used is usually the largest dimension or the diameter in the case of an area s with a symmetry of revolution.

The material subject to creep may advantageously be a photosensitive resin or a meltable material such as a metal alloy with a low melting point.

According to the invention, at least one of the parameters chosen among the shape factor and the heating temperature is selected to apply a concave relief to the embossment and the crept material is solidified in a state in which it has the said concave relief. In the case of a resin, this solidification corresponds to cross-linking.

In the following text, the manufacture of a single relief is described starting from a single embossment. However, the invention can be used by forming one or several embossments on one or several substrates, and then collectively processing the substrates and/or embossments.

The invention is based on a property of materials subject to creep such as resins, according to which these materials do not immediately change to a final stable spherical shape, but gradually creep towards this shape passing through intermediate shapes with concave parts.

The development of the embossment made of material subject to creep into the final spherical shape is faster when the quantity of material that forms the embossment is larger and when the heating temperature is higher.

Furthermore, the inventors have observed that when the height of the embossment material compared with the considered dimension of its area is small, in other words when a shape factor of the embossment is less than a given threshold value, the embossment cannot change towards the final spherical form, but stabilizes as a shape (intermediate) with a concave region.

This particular feature may be used in a first possible embodiment of the invention. An embossment with a shape factor less than a threshold value can be made, starting from which creep can take place towards a final convex stable shape. The creep heat treatment is followed by solidification of the crept material.

This solidification may for example be achieved by quenching in the case of a meltable material, or by heating in the case of a resin (heating induces cross-linking of the resin).

The crept material is solidified to consolidate it and thus fix the resulting concave shape to prevent it from being affected by subsequent manipulation of the substrate.

Considering that the embossment of material subject to creep, for example cylindrical or in the shape of a disk, has an approximately circular contact area with the substrate, the shape factor may also be defined by the height h and the diameter D, for example the ratio h/D.

In this case, in order to enable the embossment to stabilize in its concave shape, the shape factor h/D is preferably selected to be less than a threshold value as follows:

$$h/D < 0.015$$

Note that the threshold value indicated above corresponds to resins that are usually used in known photolithographic techniques and that are perfectly usable within the framework of the invention.

According to another possible embodiment of the invention when a resin embossment is used, it is also possible to make the embossment using a shape factor greater than or equal to the value of the threshold starting from which creep would be possible to a stable convex shape. In this case, heating is applied to a sufficiently high temperature to cause cross-linking of the resin before the stable convex shape is reached.

In this case, cross-linking corresponds to solidification and its main purpose is to fix the variation of the shape of the resin while creep is taking place.

The radius of curvature of the concave shape reached may be adjusted by varying the cross-linking time, to shorten it or to extend it. This may take place by controlling the heating temperature. For frequently used resins, heating may usually be done at a temperature of more than 120° C.

After creep of the embossment has taken place, the substrate and the crept material may be etched to form a shape (concave) that depends on the shape (concave) of the crept material. It is also said that the shape of the crept material is "transferred" into the substrate.

Etching of the substrate and the crept material may be characterized by its selectivity. The selectivity is defined as being the ratio between an etching rate of the material from which the substrate is made, denoted $V_s$, and an etching rate of the crept material, denoted $V_r$. The rates $V_s$ and $V_r$ depend on the materials, and also on the etching agents used. Let the selectivity be S, then:

$$S=V_s/V_r$$

The selectivity of etching induces a modification to the radius of curvature between the radius of curvature of the concave shape of the crept material and the radius of curvature of the shape transferred into the substrate.

Considering that the concave shape of the crept material and the concave shape transferred into the substrate are approximately spherical, and denoting their radii of curvature as $R_r$ and $R_s$ respectively, the following relation is satisfied:

$$R_r/R_s=V_s/V_r=S$$

The result is that the radius of curvature $R_s$ that is applied to the substrate may be adjusted at will either by modifying the radius of curvature of the crept material, or particularly by modifying the selectivity of the etching.

The selectivity of the etching may be kept constant throughout the etching step. In this case, the spherical character of the shape of the crept material is kept during the transfer.

However, it will also be possible to continuously or discontinuously vary the selectivity of etching. This may be done for example by varying the composition of the etching agents used. For example, for plasma etching, the concentration or the flow of the different reagent gases used ($CHF_3/O_2$ or $SF_6/O_2$) may be varied. The variation of the selectivity enables a spherical shape to be transferred into the substrate starting from an approximately spherical shape of the crept material.

According to another aspect of the invention, it is possible to interrupt etching before or after the complete disappearance of the crept material.

When etching is interrupted before complete disappearance of the crept material, the remaining crept material may be eliminated, for example dissolved, to leave a portion of the substrate in its initial shape around the transferred shape. In particular, when the surface of the substrate is initially plane, this process can be used to surround the concave shape with a flat.

The process mentioned above may be used to make different types of optical components, particularly such as concave mirrors, for example for laser cavities or lenses or plane-concave relief, plane-convex lenses or concave-concave or convex-convex lenses. More complex systems can also be produced.

Mirrors can easily be obtained, for example by metallizing the concave relief formed in a substrate in accordance with the invention.

One or several embossments can be formed on one of the main faces of a substrate with parallel faces, to make one or several plane-concave relief patterns. The steps in the process described are then applied. The substrate is then preferably made of a material with a refraction index and transparency adapted to the production of a lens or other optical component such as a laser cavity.

The production of a plane-convex type lens may include the following steps:
a) formation of a concave relief in the substrate in accordance with the process described above;
b) conform deposition on the substrate of a layer of optical material matching the shape of the relief;
c) flattening of an exposed face of the said layer to make it approximately plane.

An optical material is a material adapted to the production of a lens or an optical component, in other words a material with an index and transparency required for the envisaged application.

The process for manufacturing a plane-convex lens may optionally also include the deposition of a sacrificial material on the substrate before step b), and elimination of the layer of sacrificial material after step b) or step c) to expose the layer of optical material.

The production of a concave-concave lens may include the following steps:
a) formation of an embossment of material subject to creep on a substrate;
b) creep of the said material until a stable creep state is reached in which the crept material has a convex shape;
c) etching of the substrate and the crept material to apply a convex relief to the substrate;
d) deposition of a layer of optical material on the substrate matching the convex relief of the substrate;
e) flattening of an exposed surface of the layer of optical material;
f) formation of concave relief in the layer of optical material, in accordance with the process according to the invention described above, the concave relief being formed in a concave region of the layer of optical material corresponding to the convex relief of the substrate.

According to one particular embodiment of the lens manufacturing process, the process may comprise deposition of an overlayer on the optical material layer after step f), and planarization of the said overlayer.

In the same way as when manufacturing a plane-concave lens, it is possible that the lens can be separated from the substrate.

In this case, the process includes the deposition of a layer of sacrificial material before step d), and elimination of the layer of sacrificial material after step f) to expose the layer of optical material.

Note that in this process, the type of material used for the substrate may be selected freely without taking account of optical requirements such as the index or transparency.

Production of a convex-convex lens may comprise the following steps:

a) formation of a concave relief in a substrate according to the process according to the invention described above;

b) deposition of a layer of optical material matching the said concave relief, on the substrate;

c) formation of an embossment of material subject to creep on the layer of optical material, approximately facing the said concave relief;

d) creep of the embossment until a stable creep state is reached in which the shape of the crept material is convex;

e) etching of the crept material and the layer of optical material to apply the convex shape in the layer of optical material.

The process may also comprise the formation of a layer of sacrificial material on the substrate before step b), and elimination of this layer after step e), to expose the optical layer and the lens.

Other characteristics and advantages of the invention will be more easily understood after reading the following description with reference to the figures in the attached drawings. This description is given for illustration purposes only and is in no way restrictive.

The following description refers to examples in which the material used subject to creep is a resin, for simplification reasons.

DETAILED DESCRIPTION OF EMBODIMENTS OF THE INVENTION

Figure 4:
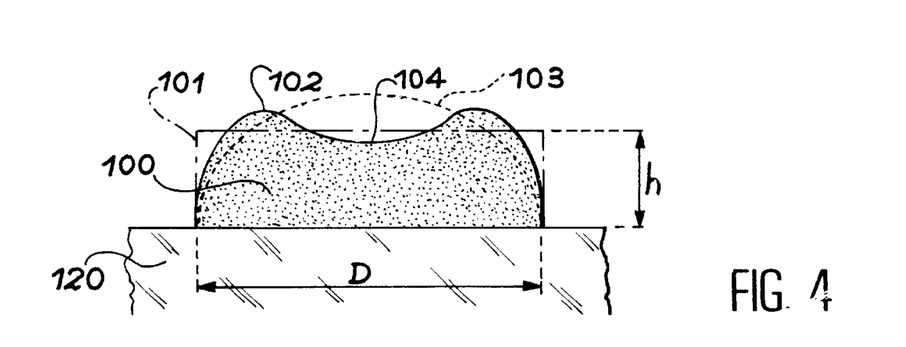
FIG. 4 is a diagrammatic section through a resin embossment illustrating the variation of the embossment under the effect of a creep heat treatment.

FIG. 4 contains a diagrammatic section showing the variation of the shape of a resin embossment 100 carried on a support 120, during a heat treatment applied at a sufficiently high temperature to make the resin creep.

The embossment 100 in FIG. 4 is initially in the shape of a disk with diameter D and height h. The sectional profile of this disk is shown as reference 101. The parameters D and h are such that the resin, under the effect of an appropriate heat treatment and the release of surface tension generated by this heat treatment, can change shape until it reaches the final spherical cap shape shown as reference 103. This spherical shape is stable. It will change further if the heat treatment is continued.

As it changes towards the stable shape, the resin passes through intermediate forms 102 that have a local concave relief 104.

As mentioned above, the inventors have demonstrated the advantages of stabilizing the resin in an intermediate shape 102 with a concave relief 104 by causing cross-linking of the resin before it reaches the stable shape 103. Cross-linking may be caused particularly by increasing the heat treatment temperature (for example, the treatment temperature T may be such that 120° C.<<T<200° C., and preferably T≈185° C.).

The concave shape can also be reached by reducing the shape factor of the embossment until it is impossible to make the complete change towards the stable spherical shape 103.

The following description presents several example embodiments of the invention taking advantage of the concave relief of the intermediate (fixed) shape of the resin embossment.

In each of the following examples, the production of a single optical component from a layer of material is described. However, note that the different processes described may be applied concomitantly and that several identical or different components may be made on the same substrate at the same time.

Figure 5:
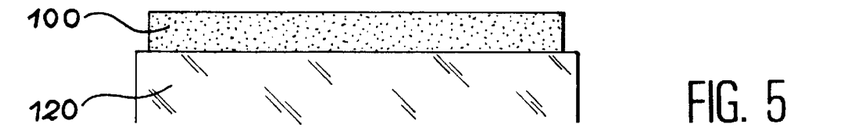
FIGS. 5, 6 and 7 are diagrammatic sections through a substrate illustrating successive steps of a process for the formation of concave relief according to the invention.
Figure 6:
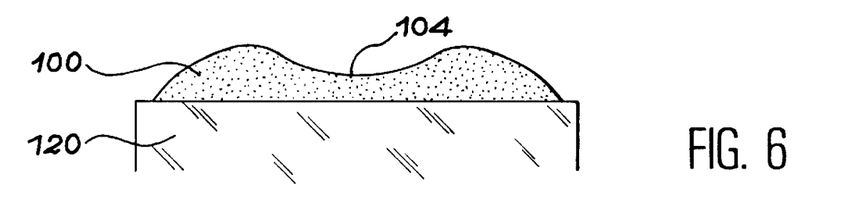
Figure 7:
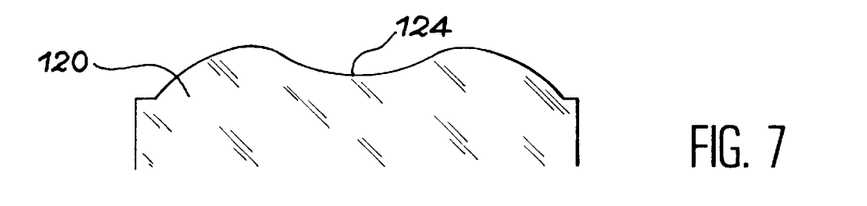

A first example embodiment of the invention is represented in FIGS. 5 to 7 that show the formation of a plane-concave type lens, in other words a lens in which the first main face is plane and the second main face has a locally concave relief.

FIG. 5 shows a substrate 120 with plane and parallel faces coated with a resin layer 100. For example, the substrate 120 may be made of glass or any other appropriate optical material. A photolithography heat treatment is applied to the resin in order to define an embossment, also marked as reference 100, which may for example be in the shape of a disk. Depending on the envisaged applications, the embossment may also be in the form of a parallelepiped or any other arbitrary shape.

FIG. 6 shows a melting annealing step in which the resin 100 is heated to a sufficiently high temperature to cause it to creep and to make crosslinking occur in a shape with a partial concave relief 104.

After cross-linking, the resin and the substrate assembly are etched, preferably with vertical anisotropic etching, in other words approximately perpendicular to the main faces of the substrate 120. For example, the etching may be a reactive ionic etching (RIE) that etches the resin and the substrate.

The regions of the substrate 120 covered by a variable thickness of resin are etched for a variable time, such that the concave pattern of the resin is reproduced in the substrate material. As mentioned above, the radius of curvature, or more generally the accentuation of the concave relief in the substrate, depend essentially on the selectivity of the etching.

FIG. 7 shows the shape of the substrate 120 when etching is continued until the resin has completely disappeared, in other words until the relief has been entirely transferred into the substrate. The concave part of the substrate is marked by reference 124.

Figure 8:
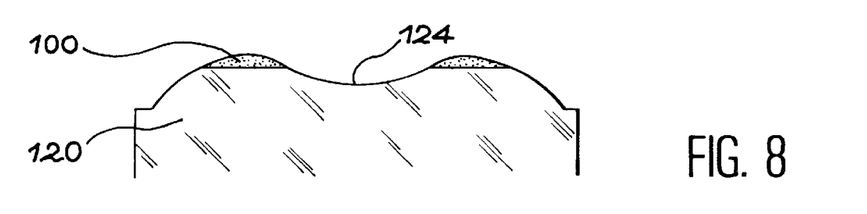
FIGS. 8 and 9 illustrate steps in the process forming a variant with respect to FIG. 7.

As shown in FIG. 8, etching can be interrupted before the resin disappears completely such that some of the resin 100 remains close to the edge of the concave part 124.

Figure 9:
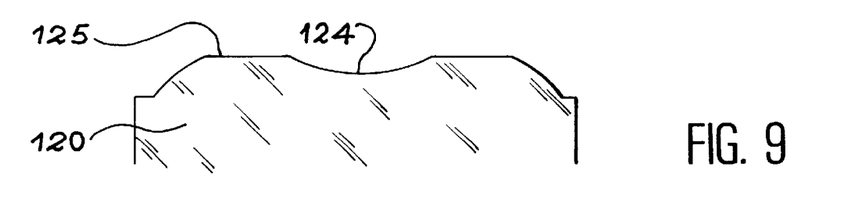

The remaining resin may be eliminated without etching the substrate in order to protect the shape of the substrate. The remaining resin may be eliminated for example by chemical etching using resin solvents or an acid that acts selectively on this resin and not on the substrate, or by a reactive plasma. As shown in FIG. 9, the result is a flat 125 close to the edge the concave part. The flat actually corresponds to a part of the initial surface of the substrate that was protected during the etching step.

The substrate as shown in FIGS. 7 and 9 may be used unchanged as an optical component if it is made of an appropriate material. It may also be metallized to form a concave mirror or be covered by a multi-layer dielectric.

We will now describe production of a plane-convex type microlens with reference to FIGS. 10 to 14.

Figure 10:
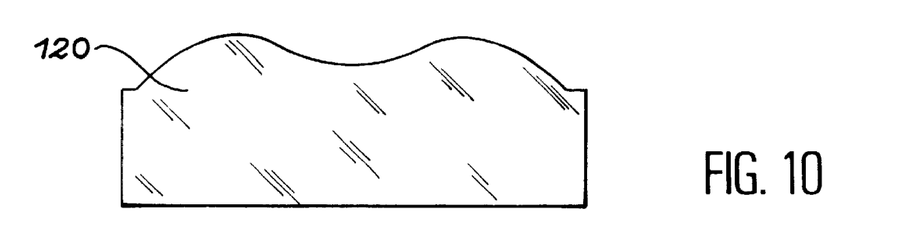
FIGS. 10 to 13 are diagrammatic sections illustrating successive steps in the manufacture of a plane-convex type lens.

A first step illustrated in FIG. 10 includes the production of a substrate 120 with a concave type relief. The substrate is obtained at the end of a process like that described above. It is considered that the substrate 120 is a material with an optical index denoted n1.

Figure 11:
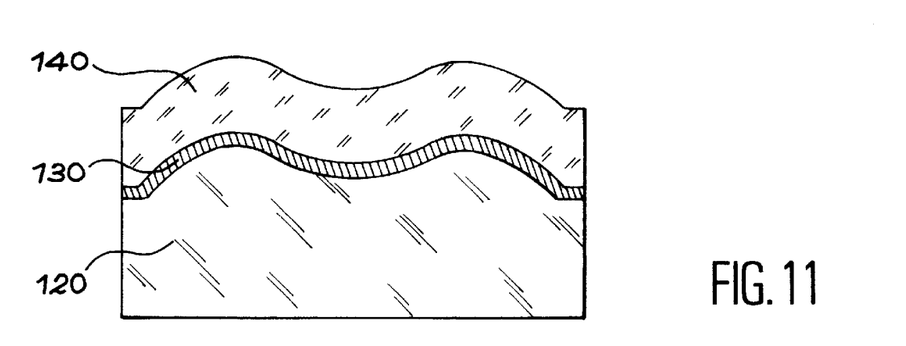

FIG. 11 shows the deposition firstly of a layer of sacrificial material 130, followed by an optical layer 140 that match the relief (concave) of the substrate, onto the surface of the substrate 120.

For example, the layer of sacrificial material 130 is a polymer layer or a metallic layer that can be eliminated selectively without altering the other layers of the structure. The role of the layer of sacrificial material is described later. However, it may be noted that the layer of sacrificial material may sometimes be omitted.

The optical index n2 of the optical layer 140 may be different from the optical index n1 of the substrate.

Figure 12:
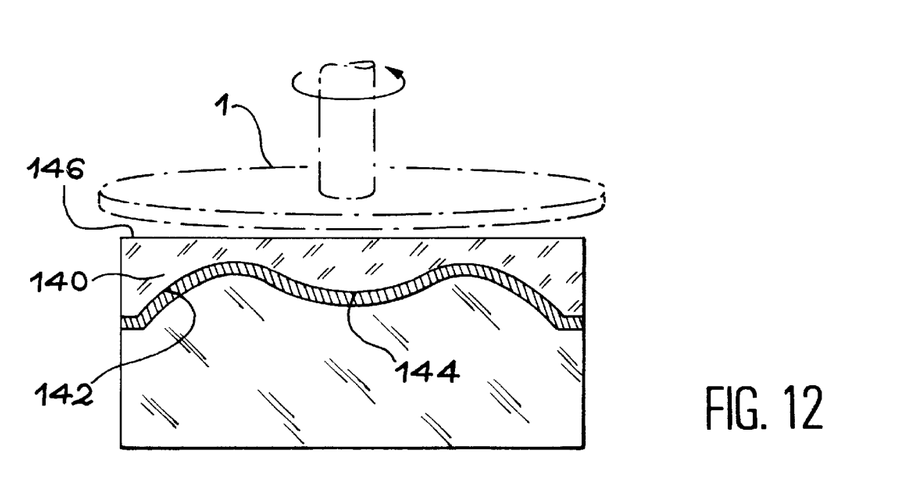

FIG. 12 shows a planarization step of the optical layer 140 by polishing. A polishing tool 1 is shown diagrammatically.

The optical layer has a lower face 142 in contact with the substrate 120, possibly through the sacrificial layer. The lower face has a convex area 144 that matches the concave relief of the substrate. The optical layer, after polishing, also has an exposed upper face 146 that is approximately plane.

Figure 13:
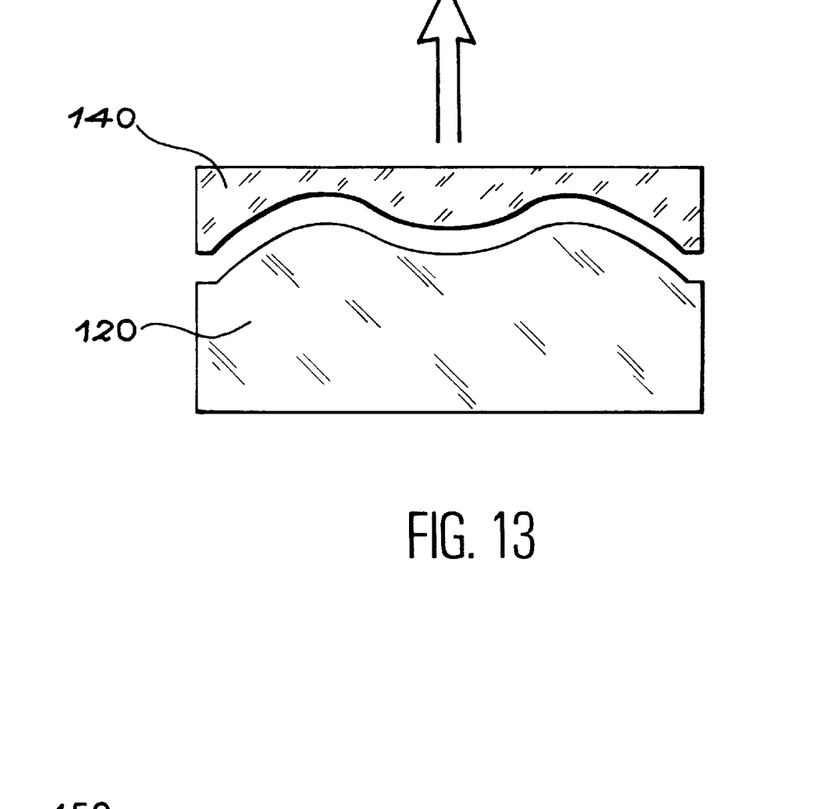

As shown in FIG. 13, after optical layer 140 has been polished, it may be separated from the substrate 120 by elimination of the sacrificial layer. It is then independent and locally comprises a plane-convex type lens. Several lenses may be formed in the same optical layer in the same manner.

Figure 14:
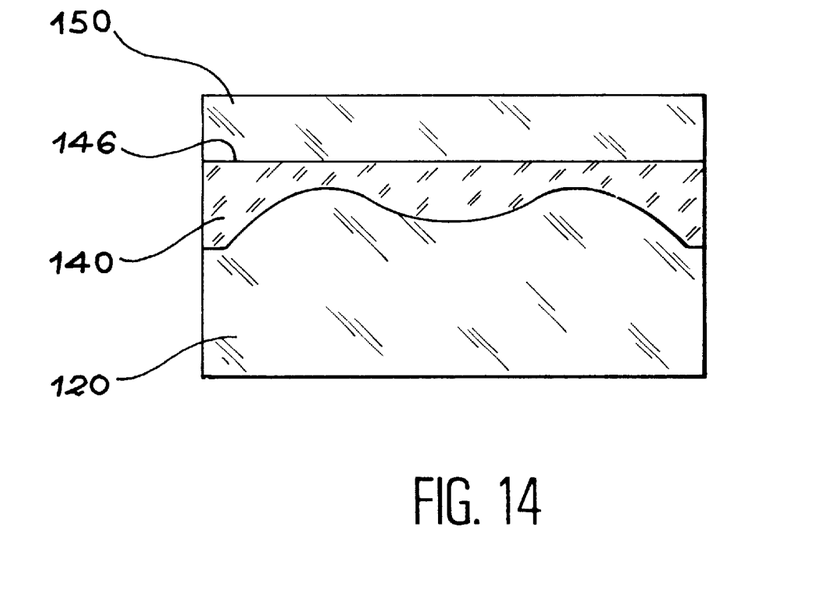
FIG. 14 is a diagrammatic section through a structure obtained in accordance with the process in FIGS. 10 to 13 and illustrates production of an optical system comprising a plane-convex type lens conform with the invention.

As a variant, the optical layer 140 may also be kept in contact with the substrate 120 as shown in FIG. 14. In this case, the sacrificial layer may be omitted.

For example, an overlayer 150 with an optical index n1 identical to (or different from) the optical index of the substrate 120 and different from the optical index of the optical layer can then be formed on the free surface 146 of the optical layer 140.

The overlayer 150 may be used as a new substrate for the transfer of relief in subsequent steps in the process.

We will now describe production of a concave-concave microlens with reference to FIGS. 15 to 21.

Figure 15:
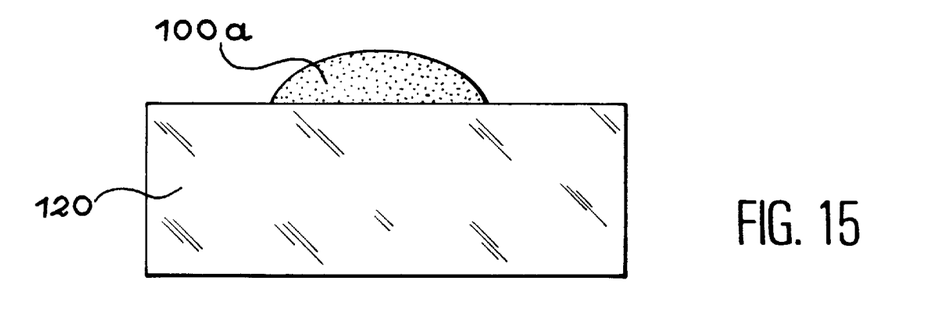
FIGS. 15 to 21 are diagrammatic sections through a structure illustrating the successive steps in the production of a concave-concave lens using the process according to the invention.

FIG. 15 shows the formation of a resin embossment 100a with a spherical convex shape on a substrate 120.

The spherical embossment is made by continuing creep of the resin until the stable spherical shape is reached before the resin is cross-linked.

Figure 16:
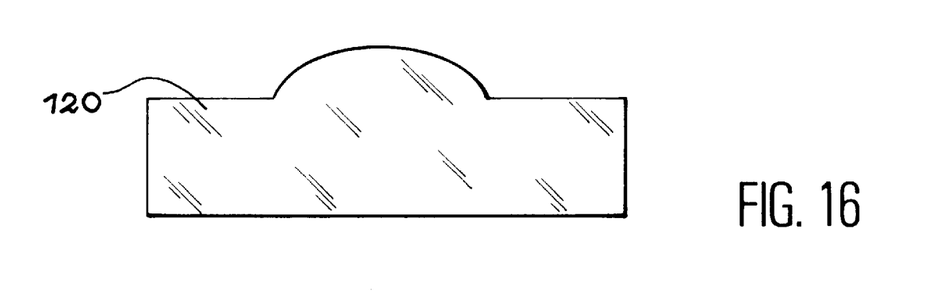

Etching then transfers the convex spherical shape into substrate 120, as shown in FIG. 16. Further information about this subject is given in the description of FIGS. 1 to 3 given above.

Figure 17:
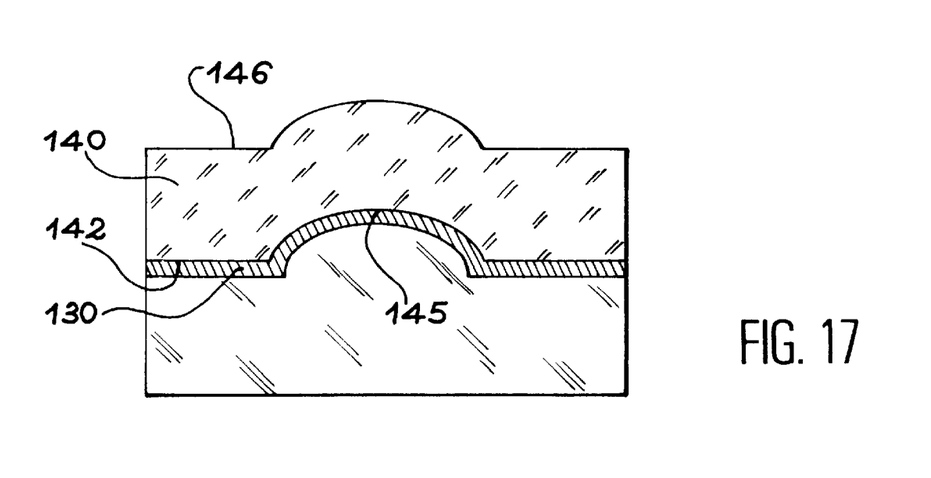

FIG. 17 shows the formation firstly of an optional layer of sacrificial material 130 and an optical layer 140 on the substrate 120. The sacrificial and optical layers match the convex shape of the substrate, such that the optical layer 140 has a lower face 142 with a convex area 145. The lower face is in contact with the substrate directly or through the sacrificial layer 130.

The free upper surface 146 of the optical layer 140 has a relief that matches the convex relief of the substrate.

Figure 18:
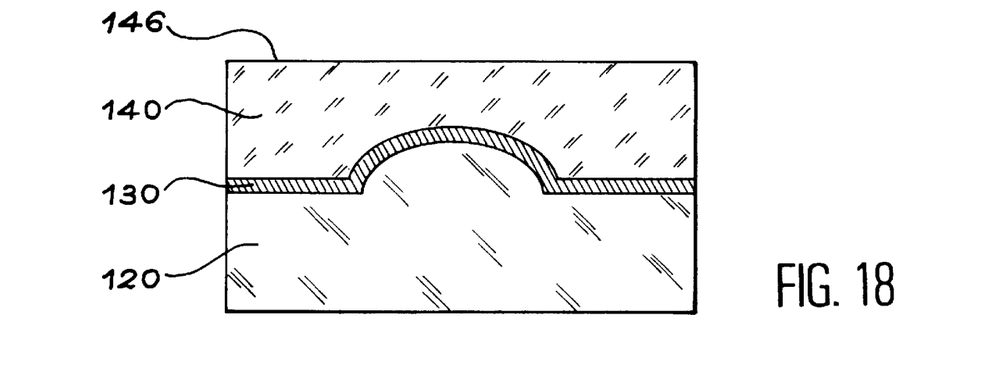

FIG. 18 shows the structure of FIG. 17 obtained after planarization of the upper face 146 of the optical layer 140.

Figure 19:
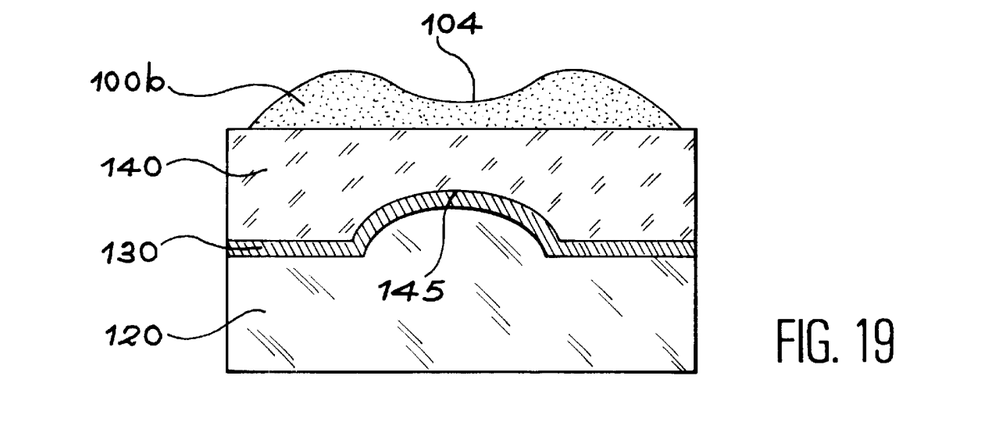
Figure 20:
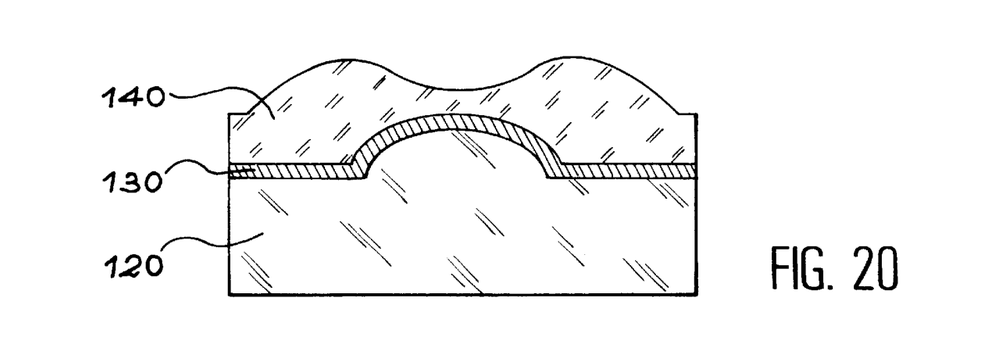

A second step in the process illustrated by FIG. 19 comprises the deposition of a resin embossment 100b on the upper plane surface 146 and treatment of this resin to apply a relief to it with a concave part 104.

The embossment is centered with respect to the position of the concave region 144 in the optical layer such that the concave part 104 of the resin coincides with the concave part 144 of the optical layer, after the treatment.

The concave relief of the resin is transferred into the optical layer by etching as described above. This gives the structure shown in FIG. 20.

Figure 21:
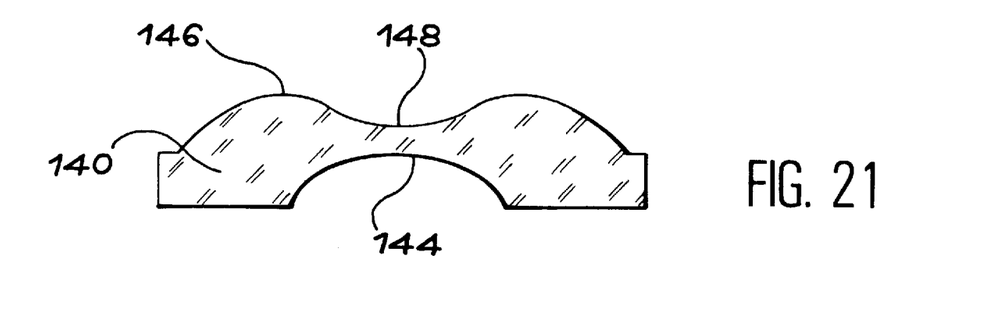

FIG. 21 shows the optical layer 140 separated from the substrate by elimination of the sacrificial layer 130. It can be seen that the layer has a concave part 148 on its "upper" face 146 that coincides with the concave part 145 of the lower face. The layer 140 thus comprises a part that forms a concave-concave lens.

Figure 22:
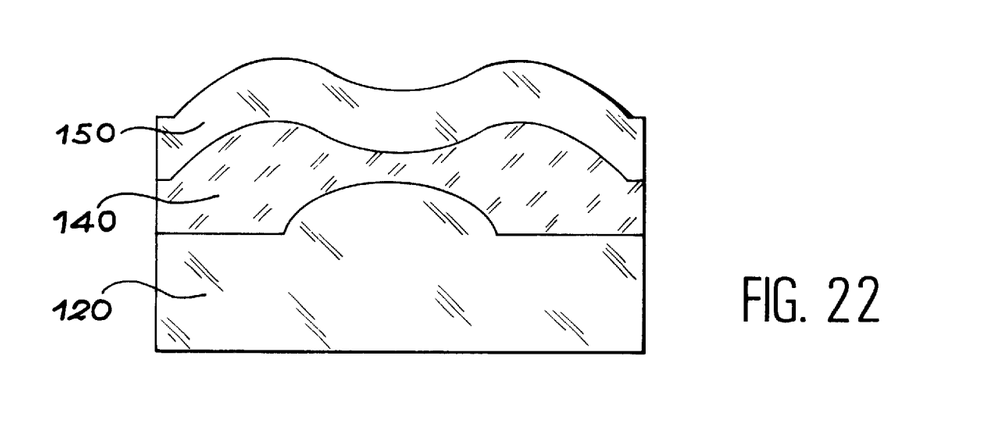
FIGS. 22 and 23 are diagrammatic sections through a structure illustrating the production of an optical system including a concave-concave lens such as that obtained by the process in FIGS. 15 to 20.
Figure 23:
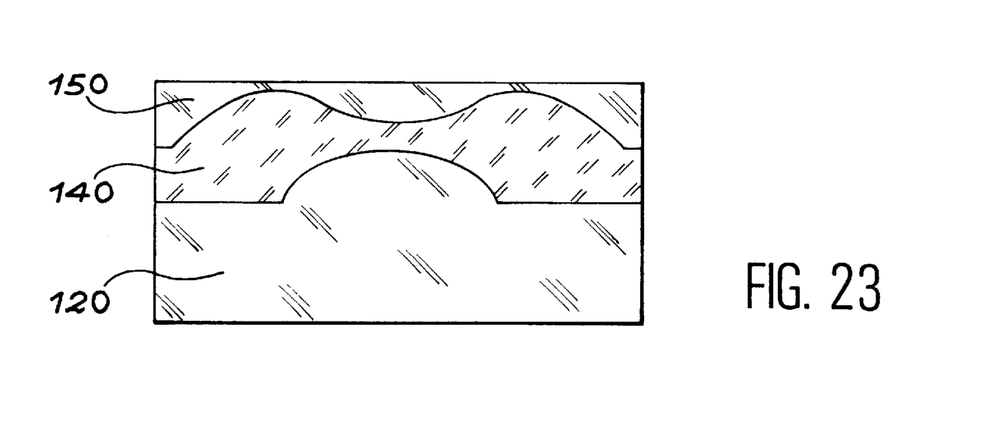

FIGS. 22 and 23 show a structure in which the optical layer 140 remains fixed to the substrate and in which it is covered by an overlayer 150.

The structure shown in FIGS. 22 and 23 does not include a sacrificial layer.

The overlayer 150 is made from a material, for example with an index n1 different from index n2 of the optical layer 140, and equal to or different from the index of substrate 120.

As shown in FIG. 23, the overlayer 150 may be planarized. This operation can give a structure with plane parallel faces using diopters formed by the optical layer 140 with substrate 120 and the overlayer 150 respectively. This structure can also be subsequently stacked with other optical elements.

FIGS. 24 to 30 described below illustrate the production of a convex-convex lens.

Figure 24:
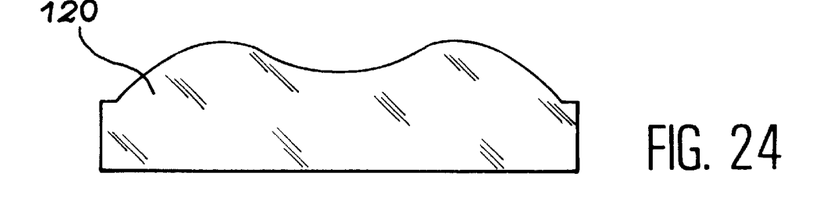
FIGS. 24 to 30 are diagrammatic sections through a structure illustrating the successive steps in the production of a convex-convex lens using a process according to the invention.
Figure 25:
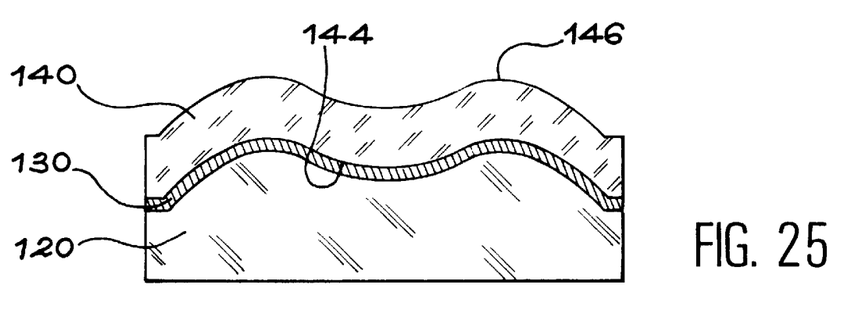

FIGS. 24 and 25 show the production of a structure comprising a substrate 120 with an upper surface containing a concave part, a sacrificial layer 130 and an optical layer 140, in order. The sacrificial layer and the optical layer match the relief of the upper face of the substrate and are fixed to it. Thus, the optical layer includes a convex region 144 on its face facing the substrate.

FIGS. 24 and 25 correspond to operational steps exactly the same as those illustrated in FIGS. 10 and 11. Therefore, this subject is described in further detail in the above description.

Figure 26:
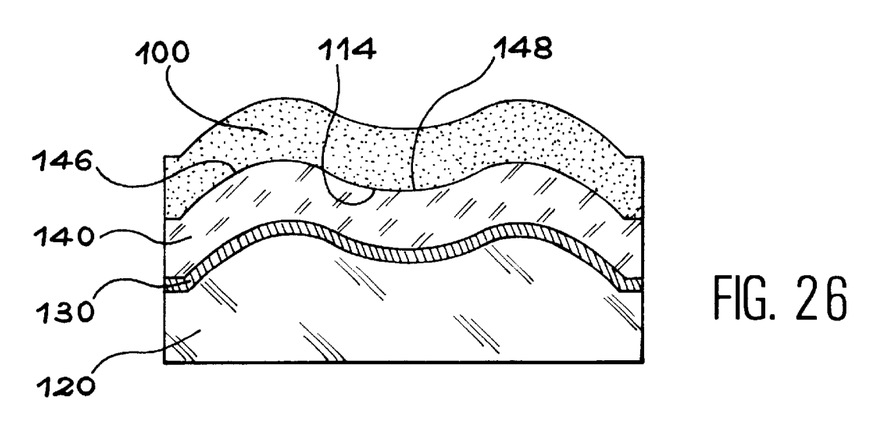

A resin layer 100 is formed on the optical layer 140 that has an upper face 146 with a concave region 148. This operation is illustrated by FIG. 26. Thus, the resin has a lower face in contact with the optical layer that comprises a convex region 114. The convex region 114 of the resin matches the concave region 148 of the upper face 146 of the optical layer 140.

Figure 27:
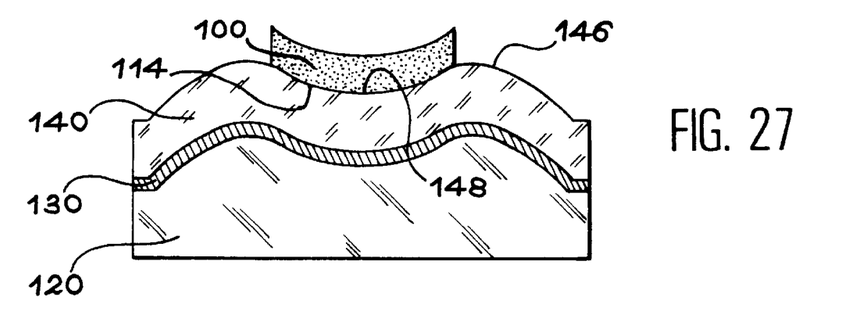

FIG. 27 shows an operation in which the resin is formed, and all that is kept at the end of this operation is a part of the layer mostly corresponding to the convex region 114.

Figure 28:
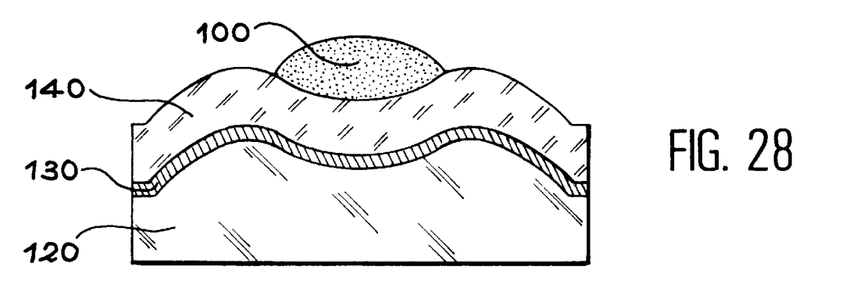

A heat treatment is then applied to the resin 100 to make it creep until an exposed convex surface is obtained.

This operation is illustrated in FIG. 28.

Figure 29:
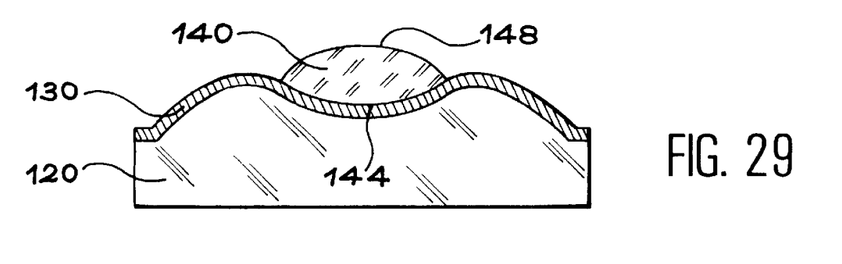

The structure is then etched anisotropically to transfer the shape of the resin into the optical layer 114. This operation is continued as shown in FIG. 29 until the part of the optical layer not covered by the resin is completely eliminated.

The optical layer 140 that remains is then in the form of a convex-convex lens with convex upper and lower parts 144, 148.

Figure 30:
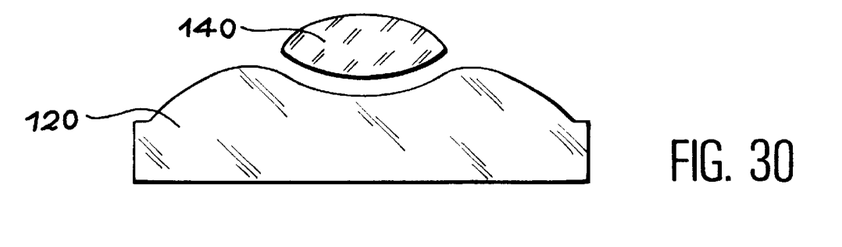

FIG. 30 shows the lens formed by layer 140 separated from the substrate 120 after elimination of the sacrificial layer.

Figure 31:
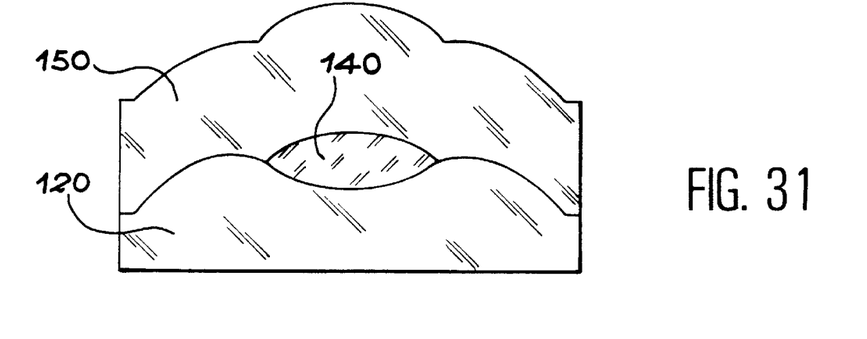
FIGS. 31 and 32 are diagrammatic sections through a structure illustrating the production of an optical system including a convex-convex lens like that obtained by the process in FIGS. 24 to 29.

FIG. 31 shows a structure resulting from a process that forms a variant of the process described above. Since there is no sacrificial layer, the lens formed in the optical layer 140 remains fixed to the substrate. It is also covered by an overlayer 150 made of a material with an index n1 different from the index n2 of the optical layer and equal to (or different from) the index n1 of the substrate to adapt the properties of the optical component thus obtained to match the target application.

Figure 32:
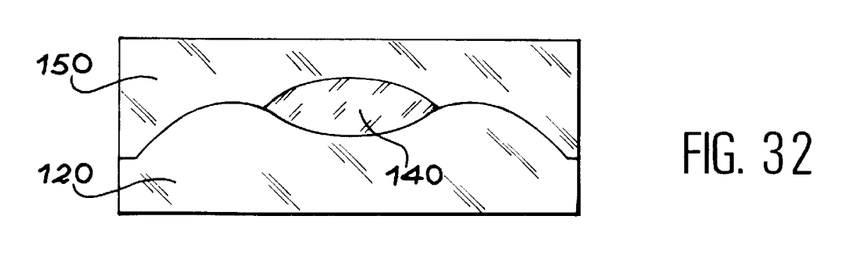

As shown in FIG. 32, the overlayer 150 can be planarized.

In processes according to the above description, only one of the faces of a substrate or a layer of material have been etched to transfer a relief to it from a resin layer. However, this technique may be applied to the two faces of a substrate.

Figure 33:
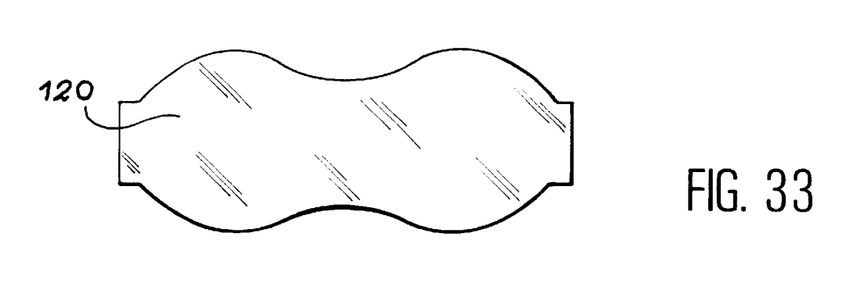
FIGS. 33 and 34 illustrate different forms of the substrate that can be obtained by a "doubleface" treatment according to the invention.

FIG. 33 shows a substrate 120, in which the two main opposite faces have been etched to form relief on each, with concave parts on the two faces coinciding.

Figure 34:
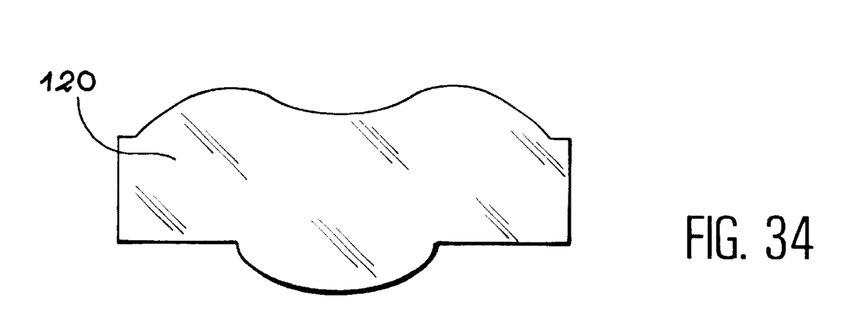

FIG. 34 shows a substrate 120 on which one of the main faces has been etched to form a relief with a concave part and the other face has been etched to form a convex relief that coincides with the concave part.

Reference Documents (1)
"Consistently reproducible lenses offer cost. Size and weight advantages for visible through infrared light". Replicated Optics Cover the Spectrum, February 1994, pages 95–97, Photonics spectra. By HAN W. SAFT (2)
"ORMOCER®s, inorganic-organic polymer materials for applications in micro systems technology" MICROSYSTEM TECHNOLOGIES'94, 4$^{th}$ International Conference on Micro Electro, Opto, Mechanical Systems and Components., Berlin Oct. 19–21, 1994 by Dr. M. Popall, Dr. J. Kappel, Dr. J. Schluz and Dr. H. Wolter.

(3)
"Fabrication of Relief—Topographic Surfaces with a One-Step UV—Lithographic Process" Proceeding: Microsystem technologies'94, Berlin, Oct. 19–21, 1994, pages 163–172 by H. J. QUENZER, W. HENKE, W. HOPPE, W. PILZ, B. WAGNER (4)
"Continuous-relief microoptical elements fabricated by laser beam writing" Proceeding: Microsystem technologies'94 Berlin, Oct. 19–21, 1994, pages 219–228 By Georges PRZYREMBEL (5)
"Generation of Relief-Type Surface Topographies for Integrated Microoptical Elements" Proceeding: Microsystem technologies'94, Berlin, Oct. 19–21, 1994, pages 209–217 by Jorg Wengelink, Herbert Engel, Ludwig Möri, Walter Döldissen (6)
"Programmable manufacturing technique of long-focal-length microlens arrays" SPIE OE/LASE 94, January 22–29, Los Angeles, USA, by F. Gex, D. Horville, G. Lelièvre, V. Serpette (7)
"Dray Etching, Path to coherent refractive microlens arrays" SPIE, Vol. 1992 Miniature and Micro-Optics and Micromechanics (1993)/283 by Margaret B. Stern, Theresa R. Jay (8)
WO 91/11320

(9) "Monolithic Q-switched unstable-resonator laser" Proceeding conference ASSL 98', No. AWD12-1, pages 373 to 375, by Hua Liu, Shou-Huan Zhou, Y. C. Chen

What is claimed is:

1. Process for forming at least a concave relief in a substrate comprising:
  forming at least one embossment on the substrate made of a material subject to creep, the embossment of the material subject to creep having a shape factor defined by a ratio of the average height h of the embossment to one of the dimensions of a contact area s between the embossment and the substrate,
  heating the material subject to creep to a sufficiently high temperature to cause the material to creep, and
  etching the substrate and the crept material to form a relief on the substrate,
  wherein at least one of the parameters selected among the shape factor and the heating temperature is adjusted to apply a concave relief to the embossment and the crept material is solidified in a state in which it has the concave relief.

2. Process according to claim 1, in which the material subject to creep is a photosensitive resin or a meltable material, said meltable material including a metal alloy with a low melting point.

3. Process according to claim 2, in which the crept material is solidified by quenching when the material subject to creep is a meltable material, and in which said solidification is achieved by heating when the material subject to creep is a resin.

4. Process according to claim 1, in which an embossment is formed with a shape factor below a threshold value starting from which creep towards a stable convex shape.

5. Process according to claim 4, in which the embossment is in the shape of a disk with a height h' and diameter D before creep such that h'<0.015.D.

6. Process according to claim 1, in which an embossment is formed made of resin with a shape factor greater than or equal to a threshold value starting from which creep towards a stable convex shape, and the heating temperature is increased sufficiently to cause cross-linking of the resin before the stable convex shape is achieved.

7. Process according to claim 6, in which said heating is applied to increase the temperature to more than 120° C.

8. Process according to claim 1, in which said etching is done with an approximately constant selectivity S, the selectivity being defined as the ratio of the rate of said etching of the substrate to the rate of said etching of the crept material.

9. Process according the claim 1, in which said etching is done with a varying selectivity S during said etching, the selectivity being defined as the ratio of the rate of said etching of the substrate to the rate of said etching of the crept material.

10. Process according to claim 1, in which said etching is interrupted before the crept material has completely disappeared, and the remaining crept material is then eliminated.

11. Process for making a plane-concave relief in which a substrate made of an optical material with approximately parallel faces is used, and in which the process according to claim 1 is used for forming the embossment on at least one of the parallel faces.

12. Process with according to claim 1 for the production of a structure comprising a plane-convex type lens, including:
   a) forming the concave relief in the substrate;
   b) conforming a deposition on the substrate of a layer of optical material matching the shape of the concave relief;
   c) flattening an exposed face of the layer of optical material to make it approximately plane.

13. Process according to claim 12, further comprising depositing a sacrificial material on the substrate before said conforming, and eliminating the layer of sacrificial material after said flattening, to expose the layer of optical material.

14. Process according to claim 12, including forming an overlayer on said exposed face of the layer of optical material after said flattening.

15. Process in accordance with claim 1 for the production of a concave-concave lens including:
   a) forming an embossment of the material subject to creep on the substrate;
   b) creeping said material until a stable creep state is reached in which the crept material has a convex shape;
   c) etching the substrate and the crept material to apply a convex relief to the substrate;
   d) depositing a layer of optical material on the substrate matching the convex relief of the substrate;
   e) flattening an exposed surface of the layer of optical material;
   f) forming concave relief in the layer of optical material, the concave relief being formed in a region of the layer of optical material corresponding to the convex relief of the substrate.

16. Process according to claim 15, comprising depositing an overlayer on the optical material layer after said forming concave relief, and planarizing said overlayer.

17. Process according to claim 15, comprising depositing a layer of sacrificial material before said depositing, and eliminating the layer of sacrificial material after said forming concave relief to expose the layer of optical material.

18. Process according to claim 1 for producing a structure comprising a convex-convex lens, including:
   a) forming the concave relief in the substrate;
   b) depositing a layer of optical material matching the concave relief, on the substrate;
   c) forming an embossment of material subject to creep on the layer of optical material, approximately facing the concave relief;
   d) creeping the embossment until a stable creep state is reached in which the shape of the crept material is convex;
   e) etching the crept material and the layer of optical material to apply the convex shape in the layer of optical material.

19. Process for producing a convex-convex lens according to claim 18, further comprising forming a layer of a sacrificial material on the substrate before said depositing, and eliminating said layer of said sacrificial material after, said etching to expose the layer of optical material.

20. Process according to claim 18, further comprising forming an overlayer after said etching covering the layer of optical material.

* * * * *